Patented May 24, 1949

2,471,272

UNITED STATES PATENT OFFICE 2,471,272

WATER-SOLUBLE CELLULOSE ETHER PLASTICIZED WITH A CYCLOMETHYLENE SULFONE

George W. Hooker, Sarnia, Ontario, Canada, and Norman R. Peterson, Midland, Mich., assignors to The Dow Chemical Company, Midland, Mich., a corporation of Delaware No Drawing. Application July 28, 1945,
Serial No. 607,664

10 Claims. (Cl. 106—176)

This invention relates to compositions of matter comprising water-soluble cellulose ethers and certain new and useful plasticizers therefor. It relates in particular to methyl cellulose compositions.

In the past, when it has been desired to plasticize such water-soluble cellulose ethers as methyl cellulose, hydroxyethyl cellulose or carboxymethyl cellulose, there has been employed a polyhydric alcohol, such as glycerol or diethylene glycol. Compounds of this type have been too volatile to provide permanent plasticizing action, and some of them are undesirably hygroscopic. Some of the water-soluble plasticizers tend to spew or bleed from water-soluble cellulose ether compositions containing them, and are objectionable for this reason.

One use for which the water-soluble cellulose ethers might be advantageously employed, because of their insensitiveness to hydrocarbons and other organic solvents, is in the inner linings of the "self-sealing" fuel cells (gasoline tanks) for military aircraft. For such use, however, it is necessary to provide a composition which can be bonded firmly to rubber, and which will form a continuous, flexible film. Such coatings cannot be prepared from these cellulose ethers without plasticizers, and the plasticizer must remain permanently in the film and must not exude therefrom.

It is accordingly among the objects of the present invention to provide a water-soluble cellulose ether composition, and particularly a methyl cellulose composition, suitable for the preparation of flexible films, and containing substantially permanent, non-bleeding plasticizer. A related object is to provide such a composition which is inert to motor fuel and may be bonded to rubber, as in self-sealing fuel cells. Other and related objects, some of which may appear in the following description and claims, include the provision of a specific type of plasticizer for water-soluble cellulose ethers, which does not bleed or evaporate from compositions containing it, and which will give the desired flexibility and continuity to films of such compositions.

We have now found that, in accordance with the present invention, the foregoing and related objects may be attained through the preparation of a composition of matter comprising a water-soluble cellulose ether plasticized with from 10 per cent up to the limit of compatibility of 3,4-dehydro-cyclotetramethylene sulfone, the 3-methyl derivative thereof, cyclotetramethylene sulfone, and the 3-methyl-, 3-alkoxy-, and 3-methyl,4-alkoxy derivatives of cyclotetramethylene sulfone, wherein the alkoxy groups contain from 1 to 8 carbon atoms, inclusive. The identity of the compounds concerned may be made clear by reference to the following structural formulas:

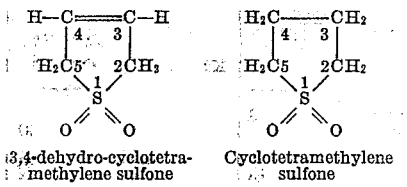

3,4-dehydro-cyclotetramethylene sulfone     Cyclotetramethylene sulfone

The compositions preferably comprise methyl cellulose and an alkoxy cyclotetramethylene sulfone wherein the alkoxy radical contains from 6 to 8 carbon atoms, inclusive. Particularly desirable compositions comprise methyl cellulose and (2-ethyl hexyloxy)-cyclotetramethylene sulfone, since these give films with excellent low temperature flexibility, which do not lose that flexibility after heating for two weeks at 110° C., and which are easily bonded to rubber to give gasolineproof coatings.

Among the numerous sulfones which are available, or easily produced, only the classes above-disclosed have been found to have the desired properties in compositions of the water-soluble cellulose ethers. Examples of compounds falling within the recited classes, given purely by way of illustration, are (a) 3,4-dehydro-cyclotetramethylene sulfone
(b) Cyclotetramethylene sulfone
(c) 3 - methyl,3,4 - dehydro-cyclotetramethylene sulfone
(d) 3-methyl cyclotetramethylene sulfone
(e) 3-methoxy cyclotetramethylene sulfone
(f) 3 - methyl,4 - methoxy - cyclotetramethylene sulfone
(g) 3-ethoxy cyclotetramethylene sulfone
(h) 3-(n-butyloxy cyclotetramethylene sulfone
(i) 3-(sec. butyloxy) cyclotetramethylene sulfone
(j) 3-(n-hexyloxy) cyclotetramethylene sulfone
(k) 3 - (2 - ethyl butyloxy) cyclotetramethylene sulfone
(l) 3-(n-octyloxy) cyclotetramethylene sulfone
(m) 3 - (2 - ethyl hexyloxy) cyclotetramethylene sulfone It should be noted that, in the mono-substitution products of cyclotetramethylene sulfone, the 3- and the 4-positions are equivalent. The above-listed and related compounds may be prepared from butadiene or isoprene, which form unsaturated sulfones with sulfur dioxide. These unsaturated sulfones may be reduced to form saturated compounds, or they may be caused to react with alcohols to form the alkoxy compounds of the types listed.

The compositions may be prepared by adding a water solution of the sulfones to an aqueous solution of the water-soluble cellulose ether. The solutions are preferably quite concentrated, to minimize the amount of drying required to produce a film after the solution has been cast on a smooth surface.

To illustrate the practice of the invention, the following table presents data regarding the tensile strength and elongation of films of compositions containing various of the sulfones identified by the same index letter as is employed in the foregoing list. Two types of methyl cellulose were employed, so the table is divided into two parts, for comparison between the plasticized compositions and the corresponding unmodified methyl cellulose.

*Table*

| Plasticizer | Amount, per cent by wt. | Air dried | | Baked 2 wks. at 110° C. | |
|---|---|---|---|---|---|
| | | Tensile Strength, Kg./sq. cm. | Elongation, per cent | Tensile Strength, Kg./sq. cm. | Elongation, per cent |
| Blank (1) | 0 | 705 | 27 | 683 | 15 |
| (a) crude | 30 | 530 | 37 | 627 | 25 |
| (a) refined | 30 | 485 | 37 | 583 | 30 |
| (c) | 15 | 890 | 45 | 707 | 20 |
| (c) | 30 | 620 | 41 | 750 | 20 |
| (e) | 30 | 410 | 48 | 590 | 15 |
| (g) | 15 | 583 | 35 | 730 | 28 |
| (g) | 30 | 323 | 45 | 480 | 13 |
| (h) | 15 | 466 | 35 | 592 | 25 |
| (h) | 30 | 418 | 40 | 551 | 15 |
| Blank (2) | 0 | 760 | 10 | 695 | 15 |
| (b) | 15 | 625 | 22 | 565 | 12 |
| (b) | 30 | 340 | 28 | 555 | 22 |
| (e) | 15 | 630 | 22 | 560 | 12 |
| (e) | 30 | 335 | 28 | 555 | 22 |
| (i) | 30 | 310 | 13 | 520 | 17 |
| (j) | 15 | 475 | 15 | 535 | 14 |
| (j) | 30 | 420 | 20 | 505 | 20 |
| (k) | 30 | 435 | 19 | 505 | 25 |
| (m) | 15 | 530 | 20 | 640 | 22 |
| (m) | 30 | 475 | 16 | 525 | 24 |

Similar results were obtained using other sulfones falling within the previously defined group, instead of the ones specifically listed in the table. The substitution of carboxymethyl cellulose (sodium salt) or of hydroxyethyl cellulose for the methyl cellulose of the examples also gave similarly useful compositions.

It is noted from the foregoing table that all of the sulfones reported effectively plasticize methyl cellulose films containing them, and that the plasticizing action persists to the greatest extent in baked films containing various hexyloxy and octyloxy cyclotetramethylene sulfones. The elongation values of films containing 3-(2-ethyl butyloxy)- and 3-(2-ethyl hexyloxy)-cyclotetramethylene sulfones are actually higher after the film has been heated for two weeks at 110° C. than when the film was simply air dried. All tensile and elongation tests were made on films conditioned for one week at 70° F. and 50 per cent relative humidity.

The compositions here concerned are all inert to the action of petroleum hydrocarbons of the types present in aviation gasoline. Coatings of the new compositions may be applied from aqueous solution to the surface of the rubber lining of self-sealing gasoline tanks, or to a textile fabric which is to be sealed to such a rubber lining, and form a permanent barrier between the gasoline and the sensitive rubber. Coatings on paper, cloth, wood, metal or other surfaces may be subjected to temperatures up to or somewhat above 100° C. for considerable periods of time without adversely affecting the flexibility or the hydrocarbon resistance of the coatings.

For most purposes it is preferred to employ at least 10 per cent of the sulfone in the methyl cellulose composition, and any greater quantity may be used, up to the limit of compatability. As the quantity of plasticizer is increased, the composition generally becomes softer, as shown in the table, but not excessively so. Thus, a good clear film was prepared from 33 per cent of methyl cellulose and 67 per cent of 3-methoxy cyclotetramethylene sulfone. This film had a tensile strength of about 300 kilograms per square centimeter and remained strong and flexible and clear after storage in air at prevailing room temperature for over 3½ years.

When methyl cellulose films containing the herein recited plasticizers are compared with others containing glycerol or diethylene glycol, it is found that the new compositions give films of greater clarity and a noticeable absence of spewing, while the compositions containing the polyhydric alcohol plasticizers exude or spew the plasticizer, and gradually become deplasticized.

In addition to the uses heretofore suggested for the new compositions, they may be employed as flexible greaseproof coatings for paper used in wrapping foods for freezing or for wrapping meats, fats and cheese. The compositions may not only be employed for many purposes for which the usual glycerol plasticized compositions are unsatisfactory, but also may be substituted for those prior compositions in most of the established uses for the walter-soluble cellulose ethers.

We claim:

1. A composition of matter consisting of a water-soluble cellulose ether, and from 10 per cent to about 67 per cent of a compound selected from the group consisting of 3,4-dehydro-cyclotetramethylene sulfone, the 3-methyl derivative thereof, cyclotetramethylene sulfone, and the 3-methyl-, 3-alkoxy-, and 3-methyl,4-alkoxy derivatives of cyclotetramethylene sulfone, wherein the alkoxy groups contain from 1 to 8 carbon atoms, inclusive.

2. A composition of matter consisting of a water-soluble cellulose ether, and from 10 per cent to about 67 per cent of a 3-alkoxy-cyclotetramethylene sulfone wherein the alkoxy groups contain from 1 to 8 carbon atoms, inclusive.

3. A composition of matter consisting of a water-soluble cellulose ether, and from 10 per cent to about 67 per cent of a 3-alkoxy-cyclotetramethylene sulfone wherein the alkoxy groups contain from 6 to 8 carbon atoms, inclusive.

4. A composition of matter consisting of a water-soluble cellulose ether, and from 10 per cent to about 30 per cent of 3-(2-ethyl butyloxy)-cyclotetramethylene sulfone.

5. A composition of matter consisting of a water-soluble cellulose ether, and from 10 per cent to about 30 per cent of 3-(2-ethyl hexyloxy)-cyclotetramethylene sulfone.

6. A composition of matter consisting of a water-soluble methyl cellulose, and from 10 per cent to about 67 per cent of a compound selected from the group consisting of 3,4-dehydro-cyclotetramethylene sulfone, the 3-methyl derivative thereof, cyclotetramethylene sulfone, and the 3-methyl-, 3-alkoxy-, and 3-methyl,4-alkoxy derivatives of cyclotetramethylene sulfone, wherein the alkoxy groups contain from 1 to 8 carbon atoms, inclusive.

7. A composition of matter consisting of a water-soluble methyl cellulose, and from 10 per cent to about 67 per cent of a 3-alkoxy-cyclotetramethylene sulfone wherein the alkoxy groups contain from 1 to 8 carbon atoms, inclusive.

8. A composition of matter consisting of a water-soluble methyl cellulose, and from 10 per cent to about 67 per cent of a 3-alkoxy-cyclotetramethylene sulfone wherein the alkoxy groups contain from 6 to 8 carbon atoms, inclusive.

9. A composition of matter consisting of a water-soluble methyl cellulose, and from 10 per cent to about 30 per cent of 3-(2-ethyl butyloxy)-cyclotetramethylene sulfone.

10. A composition of matter consisting of a water-soluble methyl cellulose, and from 10 per cent to about 30 per cent of 3-(2-ethyl hexyloxy)-cyclotetramethylene sulfone.

GEORGE W. HOOKER.
NORMAN R. PETERSON.

REFERENCES CITED

The following references are of record in the file of this patent:

UNITED STATES PATENTS

| Number | Name | Date |
| --- | --- | --- |
| 2,378,479 | Hoffman et al. | June 19, 1945 |